(12) United States Patent
Havlik et al.

(10) Patent No.: US 10,870,402 B2
(45) Date of Patent: Dec. 22, 2020

(54) SHOCK-ABSORBING DEVICE, PARTICULARLY FOR VEHICLES

(71) Applicants: Martin Havlik, Citonice (CZ); Pavel Kubera, Nová Ves u Chotebore (CZ); Roman Matl, Brno-Kralovo Pole (CZ); Alojz Hanuliak, Brno-Trnita (CZ)

(72) Inventors: Martin Havlik, Citonice (CZ); Pavel Kubera, Nová Ves u Chotebore (CZ); Roman Matl, Brno-Kralovo Pole (CZ); Alojz Hanuliak, Brno-Trnita (CZ)

( * ) Notice: Subject to any disclaimer, the term of this patent is extended or adjusted under 35 U.S.C. 154(b) by 0 days.

(21) Appl. No.: 16/094,630

(22) PCT Filed: Apr. 20, 2017

(86) PCT No.: PCT/CZ2017/050018
§ 371 (c)(1),
(2) Date: Oct. 18, 2018

(87) PCT Pub. No.: WO2017/182013
PCT Pub. Date: Oct. 26, 2017

(65) Prior Publication Data
US 2019/0106071 A1    Apr. 11, 2019

(30) Foreign Application Priority Data

Apr. 20, 2016  (CZ) ..................... 2016-229

(51) Int. Cl.
*B60R 19/00*    (2006.01)
*B60R 19/20*    (2006.01)
(Continued)

(52) U.S. Cl.
CPC ............ *B60R 19/205* (2013.01); *B60R 21/13* (2013.01); *B60R 21/36* (2013.01); *B60R 2021/138* (2013.01); *B60R 2021/23523* (2013.01)

(58) Field of Classification Search
CPC ....... B60R 19/205; B60R 21/13; B60R 21/36; B60R 21/235
See application file for complete search history.

(56) References Cited

U.S. PATENT DOCUMENTS 7,232,001 B2 *  6/2007  Hakki ................... B60R 19/205
                                                              180/271
7,753,159 B2    7/2010  Kim et al.
(Continued)

FOREIGN PATENT DOCUMENTS

CN    103 738 281 A    4/2014
EP    2 520 471 A      11/2012
(Continued)

OTHER PUBLICATIONS

CZ Search Report, dated Jan. 4, 2017.
PCT Search Report, dated Jul. 24, 2017.

*Primary Examiner* — Hau V Phan
(74) *Attorney, Agent, or Firm* — Dority & Manning, P.A.

(57) ABSTRACT

A shock-absorbing device for vehicles includes a supporting bar, and a gas generator and an airbag arranged on the supporting bar. The airbag includes an inflatable body with a first laminated foil wrapped longitudinally around the inflatable body and a second laminated foil wrapped transversely around the inflatable body. The first and second laminated foils are initially wrapped around the inflatable body in a temporary inflated state of the inflatable body so as to have a length in the respective longitudinal and transverse directions corresponding to the inflatable body in an activated state of the shock-absorbing device.

15 Claims, 5 Drawing Sheets

(51) Int. Cl.
  *B60R 21/13*  (2006.01)
  *B60R 21/36*  (2011.01)
  *B60R 21/235*  (2006.01)

(56) References Cited

U.S. PATENT DOCUMENTS

| | | | |
|---|---|---|---|
| 7,806,221 B2 * | 10/2010 | Mishra | B60R 19/205 180/271 |
| 7,845,455 B2 | 12/2010 | Kim et al. | |
| 7,951,437 B2 * | 5/2011 | Keshavaraj | B60R 21/235 280/728.1 |
| 7,967,098 B2 | 6/2011 | Choi | |
| 8,172,027 B2 * | 5/2012 | Mishra | B60R 19/205 180/271 |
| 8,377,833 B2 * | 2/2013 | Schulthess | B32B 27/12 442/291 |
| 8,662,237 B2 | 3/2014 | Chung et al. | |
| 8,672,078 B2 | 3/2014 | Lee et al. | |
| 8,752,860 B2 | 6/2014 | Kim et al. | |
| 8,764,062 B2 | 7/2014 | Chung et al. | |
| 2003/0075373 A1 | 4/2003 | Sawa et al. | |
| 2004/0049331 A1 * | 3/2004 | Schneider | B60R 19/205 701/45 |
| 2004/0262894 A1 * | 12/2004 | Kempf | B60R 21/36 280/730.1 |
| 2005/0087998 A1 | 4/2005 | Curry et al. | |
| 2005/0215143 A1 * | 9/2005 | Hehn | B32B 3/02 442/43 |
| 2005/0230940 A1 * | 10/2005 | Alexander | B60R 21/2338 280/730.1 |
| 2007/0023223 A1 | 2/2007 | Okamoto et al. | |
| 2008/0054603 A1 * | 3/2008 | Breed | B60R 21/205 280/729 |
| 2009/0001691 A1 * | 1/2009 | Takimoto | B60R 21/36 280/728.1 |
| 2009/0040004 A1 * | 2/2009 | Lee | H01H 71/7445 337/84 |
| 2010/0326782 A1 | 12/2010 | Vandenberge et al. | |

FOREIGN PATENT DOCUMENTS

| | | |
|---|---|---|
| GB | 2 516 699 A | 2/2015 |
| JP | H11170965 A | 6/1999 |
| JP | 2013001386 A | 1/2013 |
| KR | 20100028309 A | 3/2010 |
| KR | 20100029911 A | 3/2010 |
| KR | 20100052139 A | 5/2010 |
| KR | 20110018051 A | 2/2011 |
| KR | 20120056431 A | 6/2012 |
| KR | 101198842 B2 | 11/2012 |
| KR | 20130063095 A | 6/2013 |
| KR | 101382294 B1 | 4/2014 |
| WO | WO 2014/050413 A1 | 4/2014 |

* cited by examiner

SHOCK-ABSORBING DEVICE, PARTICULARLY FOR VEHICLES

TECHNICAL FIELD OF THE INVENTION

The invention relates to a shock-absorbing device, particularly for vehicles, containing a supporting bar on which a gas generator and an airbag are mounted.

BACKGROUND

The problem of the protection of road traffic participants from injuries resulting from accidents is solved using the active and passive safety elements. Systems of inflatable bags (airbags) belong to these elements. Besides airbags, the design of cars plays an important role in the safety of such cars, in particular using the deformation zones in combination with the rigid zones and airbags, etc. Airbags have been developed for a long time mainly from the point of view of the interior of the car, where front airbags, side airbags, knee airbags, etc., are known.

There are even safety systems with airbags situated outside the car, the aim of which is in particular to further reduce the impact of a possible collision of the car with a pedestrian or to enlarge the deformation zones of the vehicle.

Such systems are known, for example, from: CN103738281A, JP2013001386A, JPH11170965A, KR101198842B1, KR101382294B1, KR20100028309A, KR20100029911A, KR20100052139A, KR20110018051A-1, KR20120056431A, KR20130063095A or US2003075373A1.

The problem of both outer and inner airbags consists in substantially contradictory requirements for the small size of the airbag set in the state ready for inflation and a sufficient volume and size of the airbag in the state after inflation. A specific problem is therefore controlled contraction of the airbag after inflation when it is required that the airbag in relation to the other protection elements and systems of the car gradually spontaneously reduces its inflated volume or even deflates completely. The known outer airbags contain a basic supporting bar on which the other components of the airbag set, i.e. the inflatable bag itself and the gas generators for inflation, are mounted. However, the present systems of outer airbags are still too large, so it is not possible, for example, to mount a sufficiently voluminous airbag into the decorative sidebars on the car doors or on the front cover of the car. There are, for example, side outer airbags for passenger cars which are mounted in the threshold area of the body under the door so that they are inflated from the bottom of the car and only then they gradually open to the critical part of the impact, i.e. to the area of the side of the car door. In big lorries and especially in buses, there is a danger of the vehicle's turning over with the subsequent damage to the health and lives of passengers because there is not any system of sufficiently voluminous airbags which could be used on the side of the bus without influencing substantially on the side profile of the bus, etc.

The aim of the invention to remove or at least minimize the disadvantages of the background art.

SUMMARY

Objects and advantages of the invention will be set forth in part in the following description, or may be obvious from the description, or may be learned through practice of the invention.

An aim of the invention is achieved by a shock-absorbing device for vehicles, the principle of which consists in that the airbag includes an inflatable body which is, in the process of the production of airbag, temporarily inflated and is longitudinally wrapped around with at least one first laminated foil and transversally wrapped around with at least one second laminated foil.

The thus designed device makes it possible to pack the airbag even in a very small configuration which enables creating a very subtle design, which can be accommodated, for example, even in the decorative bar on the front or side or the rear part of the vehicle so that the airbag from the very beginning inflates directly in the space between the vehicle and the obstacle into the space of the expected collision. At the same time, the device according to the invention makes it possible to create a large volume airbag taking up only a limited space in the ready state and making it possible to be installed, for example, on the side outer part of the bus as a protection from turning over, etc. The laminated foils, in particular nano foils, make it possible to achieve the required mechanical qualities of the airbag even with a simple design and production using welding, sticking, etc., of the sheet material, i.e., without sewing, which creates relatively voluminous seams in comparison to the welded or stuck seams of the laminated foils. Another advantage is represented by a high resistance of the laminated foils against punching even in relatively small thicknesses.

DETAILED DESCRIPTION

Figure 1:
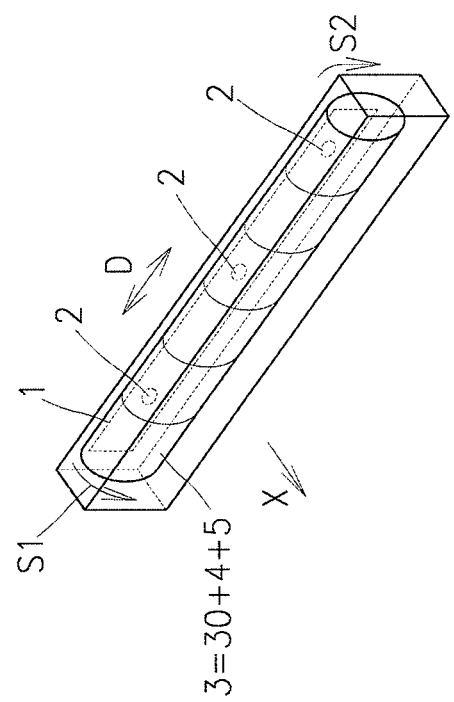
FIG. 1 represents a spatial arrangement of the device according to the invention.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

The invention will be described based on non-limiting embodiments for the use on a passenger car or a bus.

The shock-absorbing device for vehicles contains a supporting bar 1 on which the other elements of the device are mounted. The supporting bar 1 at the same time is used for fixing the device to the frame of the vehicle. The front part of the device is either covered by the front board of the car's decorative bar, or is covered by a part of the car body, or is covered by an individual covering bar which together with the supporting bar completes the device according to the invention into the form of the independent closed body in the inner space of which the individual elements of the device according to the invention are arranged, which will be described hereinafter. The front board of the decorative bar of the vehicle or a part of the body of the vehicle covering the front part of the device, or an independent covering bar, are designed so that the inflatable part of the device, i.e. during inflation the airbag 3 itself, penetrates easily through this front part of the decorative bar of the vehicle, or the particular covering part of the body, or the the above-mentioned independent covering bar. In another not represented embodiment, the set of the supporting bar with the packed airbag and gas generators 2 is inserted in a self-supporting container, thus forming a self-supporting unit containing an airbag, which is suitable for integration within the frame of the vehicle. For the front part of the self-supporting container, similar rules are applied that make it possible for the airbag to penetrate through the front part of the container during the inflation in impact.

On the supporting bar 1 is mounted at least one gas generator 2 which, with its front side which produces the gas for the inflation of the airbag 3, extends into the inner space of the airbag 3.

Figure 2:
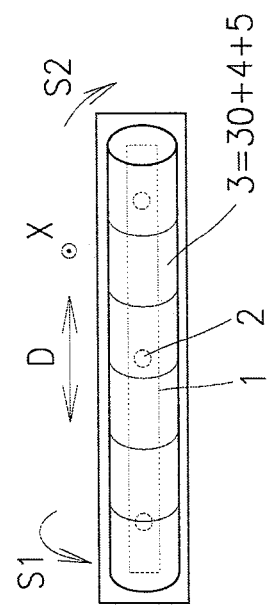
FIG. 2 represents a front view of the device according to the invention.
Figure 3:
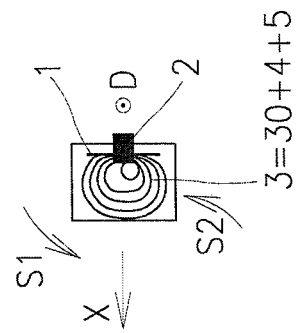
FIG. 3 is a side view of the device according to the invention.
Figure 5:
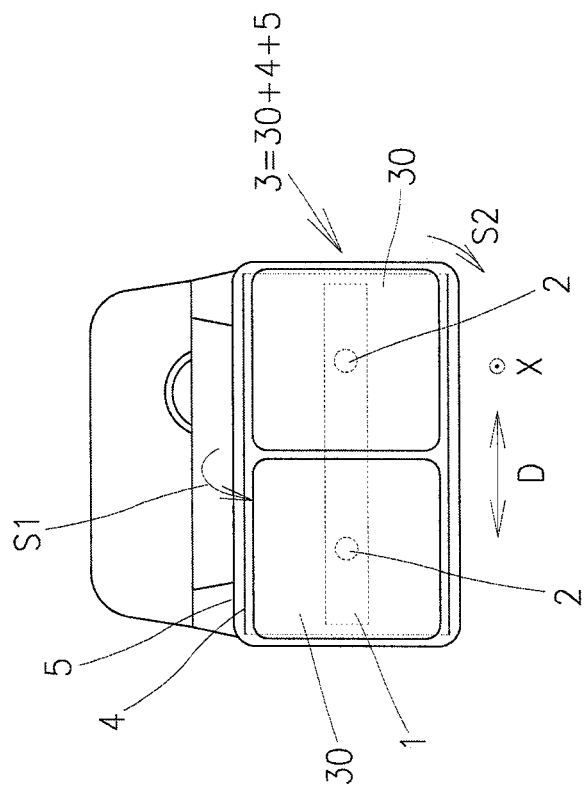
FIG. 5 represents a side view of the inflated airbag according to the invention containing a three chamber inflatable body with interconnected chambers.

The airbag 3 contains an inflatable body 30, which is in the ready state packed on the supporting bar 1 and, with its back part, is fixed to the supporting bar 1. In different exemplary embodiments, the inflatable body 30 has one chamber (FIGS. 1 to 3) or has more chambers (FIG. 5) with the chambers interconnected. In the case of the design with more chambers, more interconnected chambers of the inflatable body 30 are situated either in the direction of the length of the supporting bar 1 side-by-side or more interconnected chambers of the inflatable body 30 are situated in the direction to the front of the supporting bar 1, i.e. in the direction in which the inflatable body 30 mostly extends in the direction X against the direction of the impact (see FIG. 5). In another embodiment, more interconnected chambers of the inflatable body 30 are situated in both directions at the same time, i.e. both in the direction of the length of the supporting bar 1 and in the direction to the front of the supporting bar 1, i.e. in the direction X against the impact.

Figure 4:
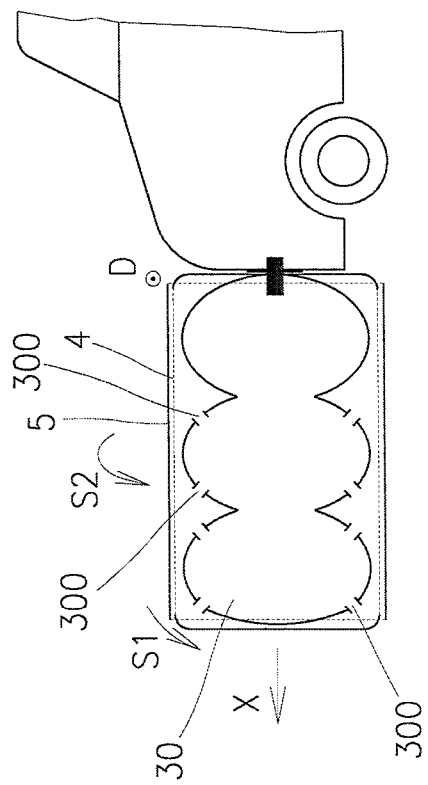
FIG. 4 is a front view of the device according to the invention after inflation on the front part of a car where the airbag contains a pair of side by side arranged independent inflatable bodies wrapped around in the longitudinal and transversal direction with a laminated foil.
Figure 6:
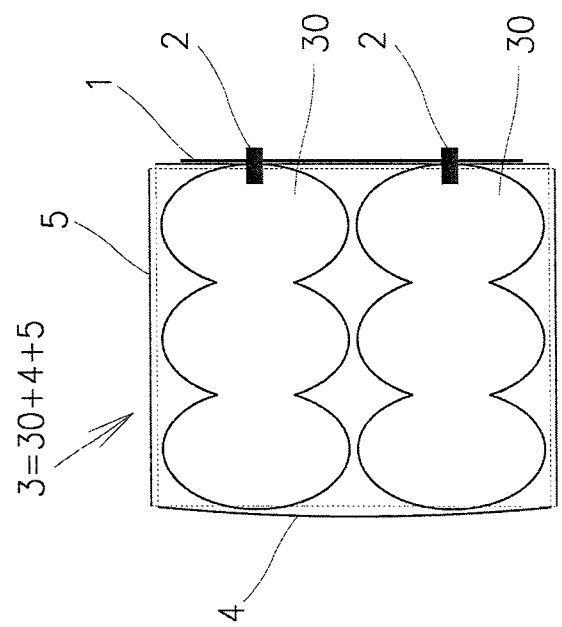
FIG. 6 shows an upper view of the inflated airbag according to the invention containing a pair of side by side arranged independent inflatable bodies, each of them consisting of three interconnected chambers.

In the example of embodiment in FIG. 4, the airbag 3 contains a system of independent inflatable bodies 30 situated along the length of the supporting bar 1 side-by-side or with gaps, each of which is provided with at least one individual gas generator 2, etc. These inflatable bodies 30 are separated from each other, i.e. they create independent inflatable bodies 30 with independent gas generators 2. Independent inflatable bodies 30 are again either with one chamber or more interconnected chambers, as is clearly seen from FIG. 6, etc. In another embodiment, the airbag 3 contains a set of independent inflatable bodies 30, and at least one of them has more chambers and at least one them has one chamber, etc.

The creation of the inflatable bodies 30 itself is from the point of view of both spatial arrangement and distribution along the length of the supporting bar 1 considerably variable and enables to adjust the size of the inflatable bodies 30 both in the packed state and in the inflated state to any installation, whether it is an installation on the front or rear part of the vehicle or on the side part of the vehicle, whether it is a passenger car, a lorry or a bus, etc.

The inflatable body 30 (or bodies 30) of the airbag 3, hereinafter 'inflatable body' 30, is made from a laminated foil, i.e. a thin sheet material containing at least two layers connected into one laminated foil. In a particular embodiment, the inflatable body of the airbag 3 is made from a nano foil.

The inflatable body 30 is, as a hollow volumetric body, created by welding and/or sticking and/or other suitable technique of attaching flat parts of the laminated foil, which create the walls of the inflatable body 30 and determine the hollow inner space of the inflatable body 30.

The airbag 3 further contains at least one first laminated foil 4 for the longitudinal wrapping around the inflatable body 30 and at least one second laminated foil 5 for transversal wrapping around the inflatable body 30, which are in the directions described hereinafter arranged on (wrapped around) the outer surface of the inflatable body 30.

Figure 7:
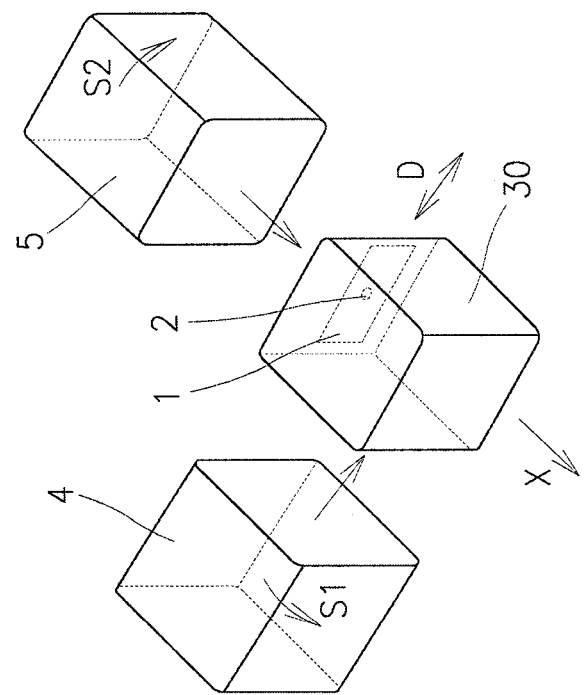
FIG. 7 shows a schematic spatial representation of the successive placing of the longitudinal and transversal laminated foil in the inflated state of the airbag before the reverse drawing off of air from the airbag and packing the airbag onto the supporting bar according to FIGS. 1-3.

The first laminated foil 4 is on the outer surface of the inflatable body 30 and is placed (wrapped around) in the process of the production of airbag 3, when the produced inflatable body 30 is temporarily inflated to its full volume and, subsequently, the inflatable body 30 is, after this temporal inflation, wrapped around by at least one first laminated foil 4 in the direction S1 which is perpendicular to the direction D of the length of the supporting bar 1 as presented in FIG. 7. The direction D of the length of the supporting bar 1 is perpendicular to the direction X against the impact so the direction S1 of the wrapping of the first laminated foil 4 around the inflatable body 30 is identical with the direction X against the impact.

The second laminated foil 5 is on the outer surface of the inflatable body 30 and is placed (wrapped around) in the process of production of the airbag 3 as well, when the produced inflatable body 30 is temporarily inflated to its full volume. The second laminated foil 5 is, on the temporarily inflated inflatable body 30, wrapped around the first laminated foil 4 in the direction S2, which is perpendicular to the direction S1 of the first laminated foil 4, i.e. substantially identical with the direction D of the length of the supporting bar 1.

In another embodiment, the order of the first and the second laminated foils 4, 5 is reversed, i.e. the second laminated foil 5 is wrapped around the outer surface of the inflatable body 30 directly and the first laminated foil 4 is wrapped around the inflatable body 30 on the second laminated foil 5.

After wrapping around the temporarily inflated inflatable body 30 by the first and the second laminated foils 4, 5, the air is drawn off from the airbag 3 prepared in this manner, i.e. the set of the inflatable body 30 and the first and the second laminated foils 4, 5. The airbag is then packed and fixed on the supporting bar 1 in which the gas generators 2 projecting into the inner space of the deflated airbag 3 are fixed and, in this manner, the shock absorbing device for the vehicles is created and the airbag 3 itself, as well as the means of inflation absorbing the shock and its consequences, is created by the inflatable body 30 and a pair of cover laminated foils 4, 5. With advantage, all three parts 30, 4, 5 are made from nano foil.

Similarly to the inflatable body 30, in the first and the second laminated foils 4, 5, a laminated foil is used as a thin sheet material containing at least two layers connected into one laminated foil. In a particular embodiment, the first and the second laminated foils 4, 5 are made from a nano foil.

The material of the individual layers of the laminated foil is either the same material or it is a sandwich of layers of at least two materials. For the improvement of the resistance of the laminated foil, especially against chemical substances and the heat from the gas produced by the gas generators 2 during the inflation of the airbag 3 before the impact, at least one inner layer of at least the inflatable body 30 is provided with a protection surface, e.g. a suitable paint and/or at least one inner layer of the laminated foil is made from a special material resistant or with a higher resistance against the action of heat and chemical substances from the gas produced by the gas generators 2.

Figure 8:
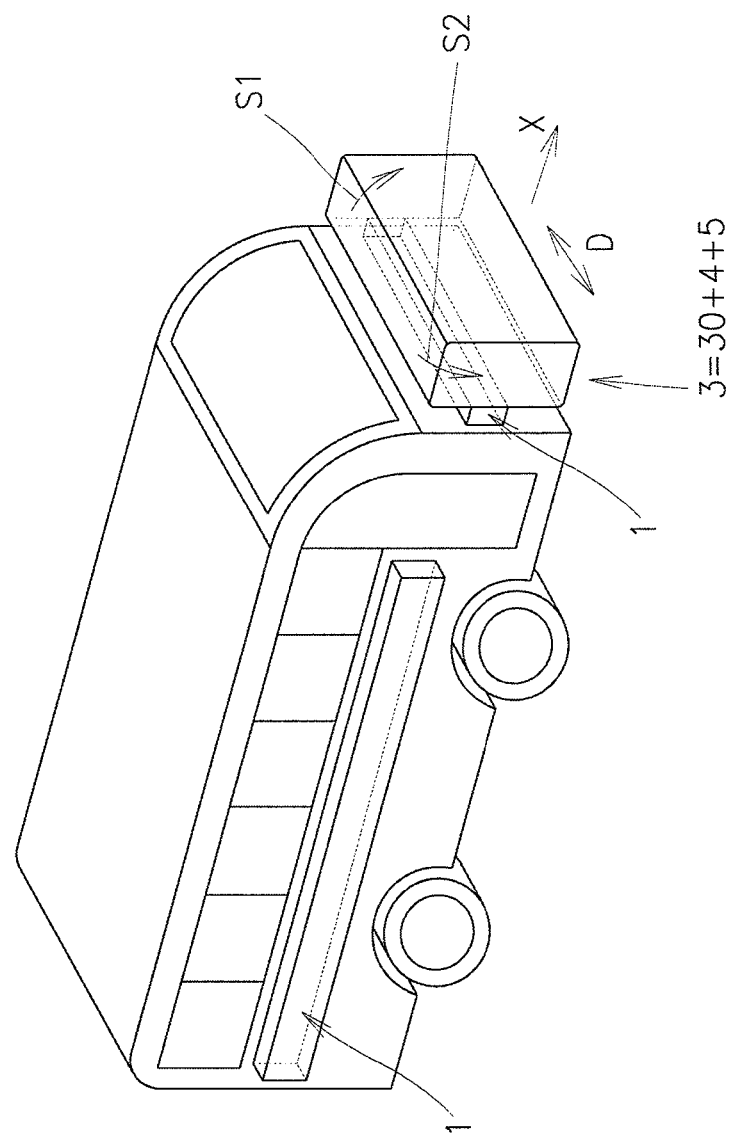
FIG. 8 shows the use of the device according to the invention on the front (inflated state) and side (ready state) part of a bus.
Figure 9:
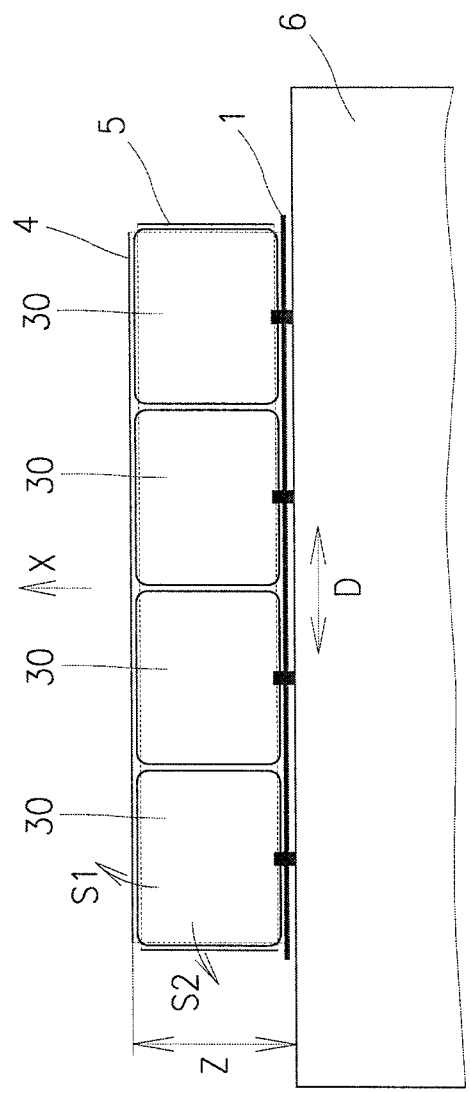
FIG. 9 represents the plan of the device on the side part of a bus after inflation.

FIGS. 8 and 9 represent the use of the device according to the invention on the front and on the side part of a bus 6 where, on the front part of the bus 6, a supporting bar 1 is mounted with the other elements of the device and the device is in the activated state when the airbag 3 is inflated. On both side parts of the bus 6 in the direction of the length of the bus 6, a supporting bar 1 with other elements of the device according to the invention is mounted. On the bus 6, the supporting bar 1, and consequently the other elements of the device, have adequately greater sizes in comparison to the use of the device according to the invention on the passenger car, which is why the airbag 3 can have substantially greater sizes and volume in the inflated state, which corresponds to substantially greater sizes of a bus. The bus 6 with the device according to the invention, can obtain a side protection area Z having a length of up to tens of centimetres to 1 meter long with the airbag 3 inflated. The use of the device according to the invention on the side parts of the bus 6 protects the crew of the bus 6, especially in situations when the bus 6 turns over and also during the side impact. The device according to the invention has on the side of the bus 6 in the ready state (i.e. packed and uninflated airbag 3 on the supporting bar 1), negligible volume and size relative to the dimensions of the bus 6.

For the improvement of the absorbing effect, for which it is suitable that after the inflation of the airbag 3 and during the impact or after it the pressure of the gas inside the airbag 3 is reduced, preferably in a controlled manner, (the inflating gas is let off), it is advisable for the inflatable body 30 to be provided, preferably on the whole of its surface, with a system of small regularly distributed through-holes 300 (FIG. 5) which form a flat perforation of the inflatable body 30 to enable the inflation gas to escape gradually from the inflatable body 30, and thus even from the airbag 3 after its inflation, because the possible gaps between the first and the second laminated foils 4, 5 in the corner parts of the airbag 3 are not additionally sealed and the inflation gas can escape here from the airbag 3 into the surrounding environment. To allow the inflation gas to escape from the inflatable body 30, the size of the individual holes 300 is greater than the size of the molecules of the inflation gas from the gas generator 2. The shock-absorbing device works in such a manner that the supporting bar 1 with the gas generators 2 and the airbag 3 in the packed state is placed in the frame of the vehicle and is connected to the initiating device of the vehicle, i.e. the device which determines the starting moment for generating the gas and inflating the airbag 3. After the initiation of the gas generators 2, the generated gases expand violently inside the packed inflatable body 30 and the airbag 3 inflates and enlarges its volume up to the limit value given by the volume of the inflatable body 30. During the inflation, the laminated foils 4, 5 wrapped longitudinally and transversally around the inflatable body 30 prevent substantial deformation of the material (laminated foil) of the inflatable body 30, which leads to achieving the required (previously set) size and shape of the inflation of the airbag 3 to. As soon as the pressure of the gases generated inside the inflatable body 30 exceeds the particular value, before the impact itself or as a consequence of the impact, the generated gas starts escaping from the inflatable body 30 through perforation by means of the holes 300, getting between the inflatable body 30 and the first and the second laminated foils 4, 5 and further escapes through the gaps between the first and the second laminated foils 4, 5, and thus the pressure of the gas in the airbag 3 is reduced. During this process and during the impact, a deformation, the surface extension of the first and the second laminated foils 4, 5, can occur, but due to the resistance of the material, the possibility of damage to the first and the second laminated foils 4, 5 is minimal. From the above stated facts, it is clear that the process of inflation of the inflatable body 30 of the airbag before the impact and the process of the reduction of the pressure of the gas in the airbag 3 after the impact can be modified of even set for particular conditions and the use of the shock-absorbing device when, for example, the material, the number and thickness of the individual layers of the laminated foils used determine the mechanical qualities of the particular foil, especially the strength and the extent of the elastic and plastic deformation of each laminated foil, similarly the number of wrappings with the first and the second laminated foils 4, 5.

INDUSTRIAL APPLICABILITY

The invention is applicable particularly in car industry, in general in transportation or protection of persons and property.

Modifications and variations can be made to the embodiments illustrated or described herein without departing from the scope and spirit of the invention as set forth in the appended claims.

The invention claimed is:

1. A shock-absorbing device for vehicles, comprising:
a supporting bar;
one or more gas generators arranged on the supporting bar;
an airbag arranged on the supporting bar;
the airbag further comprising an inflatable body with a first laminated foil wrapped longitudinally around the inflatable body and a second laminated foil wrapped transversely around the inflatable body;
wherein the first and second laminated foils are initially wrapped around the inflatable body in a temporary inflated state of the inflatable body;
the first and second laminated foils wrapped around the inflatable body in an activated state of the shock-absorbing device and comprising a length that limits a volume of the inflatable body in the activated state of the shock-absorbing device; and
wherein the first laminated foil is wrapped on the inflatable body in a direction perpendicular to a length direction of the supporting bar, and the second laminated foil is wrapped on the inflatable body over the first laminated foil in a direction perpendicular to the first laminated foil.

2. The device according to claim 1, wherein the first laminated foil and the second laminated foil are formed from at least two layers.

3. The device according to claim 2, wherein the first laminated foil and the second laminated foil are nano foils.

4. The device according to claim 1, wherein the inflatable body comprises an inner layer made from a material or treated with a protective surface that is resistant to heat and chemical substances from gas generated by the gas generator upon activation of the device.

5. The device according to claim 1, wherein the inflatable body comprises perforation through-holes that allow gas generated by the gas generator upon activation of the device to escape from the inflatable body.

6. The device according to claim 1, wherein the inflatable body comprises a single inflatable chamber.

7. The device according to claim 1, wherein the inflatable body comprises a plurality of inflatable chambers.

8. The device according to claim 1, wherein the supporting bar, the gas generator, and the airbag are enclosed in a self-supporting housing.

9. A shock-absorbing device for vehicles, comprising:
a supporting bar;
one or more gas generators arranged on the supporting bar;
an airbag arranged on the supporting bar;
the airbag further comprising an inflatable body with a first laminated foil wrapped longitudinally around the inflatable body and a second laminated foil wrapped transversely around the inflatable body;
wherein the first and second laminated foils are initially wrapped around the inflatable body in a temporary inflated state of the inflatable body;
the first and second laminated foils wrapped around the inflatable body in an activated state of the shock-absorbing device and comprising a length that limits a volume of the inflatable body in the activated state of the shock-absorbing device; and
wherein the second laminated foil is wrapped on the inflatable body in a direction corresponding to a length direction of the supporting bar, and the first laminated foil is wrapped on the inflatable body over the second laminated foil in a direction perpendicular to the second laminated foil.

10. The device according to claim 9, wherein the first laminated foil and the second laminated foil are formed from at least two layers.

11. The device according to claim 9, wherein the inflatable body comprises an inner layer made from a material or treated with a protective surface that is resistant to heat and chemical substances from gas generated by the gas generator upon activation of the device.

12. The device according to claim 9, wherein the inflatable body comprises perforation through-holes that allow gas generated by the gas generator upon activation of the device to escape from the inflatable body.

13. The device according to claim 9, wherein the inflatable body comprises a single inflatable chamber.

14. The device according to claim 9, wherein the inflatable body comprises a plurality of inflatable chambers.

15. The device according to claim 9, wherein the supporting bar, the gas generator, and the airbag are enclosed in a self-supporting housing.

* * * * *